(12) United States Patent
Hayashi et al.

(10) Patent No.: US 11,557,902 B2
(45) Date of Patent: Jan. 17, 2023

(54) INFORMATION PROCESSING APPARATUS AND STORAGE MEDIUM STORING PROGRAM

(71) Applicant: BROTHER KOGYO KABUSHIKI KAISHA, Nagoya (JP)

(72) Inventors: Seigo Hayashi, Nagoya (JP); Hajime Usami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 445 days.

(21) Appl. No.: 16/728,760

(22) Filed: Dec. 27, 2019

(65) Prior Publication Data

US 2020/0212683 A1   Jul. 2, 2020

(30) Foreign Application Priority Data

Dec. 28, 2018   (JP) .............................. JP2018-246990

(51) Int. Cl.
*H02J 3/46*   (2006.01)
*H02J 7/34*   (2006.01)
(Continued)

(52) U.S. Cl.
CPC ................ *H02J 3/46* (2013.01); *H02J 7/342* (2020.01); *H04N 1/00907* (2013.01); *H02J 2207/20* (2020.01); *H02M 1/0045* (2021.05)

(58) Field of Classification Search
CPC .. H02J 1/084; H02J 7/342; H02J 1/082; H02J 3/46; H02J 2207/20; H02M 1/0045; H04N 1/00907
See application file for complete search history.

(56) References Cited

U.S. PATENT DOCUMENTS

2012/0057891 A1   3/2012   Ishikura et al.
2015/0201100 A1*  7/2015   Saisho ............... H04N 1/00899
                                                  358/1.14
(Continued)

FOREIGN PATENT DOCUMENTS

JP   2006-331080 A   12/2006
JP   2008-529456 A    7/2008
(Continued)

OTHER PUBLICATIONS

Office Action (Notice of Reasons for Refusal) issued in corresponding Japanese Patent Application No. 2018-246990, dated Sep. 27, 2022.

*Primary Examiner* — Jared Fureman
*Assistant Examiner* — Duc M Pham
(74) *Attorney, Agent, or Firm* — Merchant & Gould P.C.

(57) ABSTRACT

An interface performs power delivery and communication with an external apparatus. A convert device is configured to convert a voltage of input power that is supplied from the external apparatus through the interface. A convert device includes a first convert device having first conversion efficiency and a second convert device having second conversion efficiency different from the first conversion efficiency. A processing device is configured to operate by using power converted by the convert device. A controller is configured to switch a conversion state between: a first conversion state of converting, by the first convert device, the input power supplied from the external apparatus through the interface and supplying the converted input power to the processing device; and a second conversion state of converting, by the second convert device, the input power supplied from the external apparatus through the interface and supplying the converted input power to the processing device.

20 Claims, 6 Drawing Sheets (51) Int. Cl.
*H04N 1/00* (2006.01)
*H02M 1/00* (2006.01)

(56) References Cited

U.S. PATENT DOCUMENTS

2015/0358491 A1\* 12/2015 Watanabe .......... H04N 1/00907
358/1.13
2017/0229892 A1 8/2017 Kobayashi

FOREIGN PATENT DOCUMENTS

| | | | | |
|---|---|---|---|---|
| JP | 2009-220366 | A | 10/2009 | |
| JP | 2012-78781 | A | 4/2012 | |
| JP | 2015-176443 | A | 10/2015 | |
| JP | 2017-138870 | A | 8/2017 | |
| JP | 2018-143016 | A | 9/2018 | |
| KR | 100408304 | B1 \* | 12/2003 | ............. B41J 29/38 |
| WO | 2006/080260 | A1 | 8/2006 | |

\* cited by examiner

| OPERATION STATE | INPUT VOLTAGE V1 [V] | OUTPUT VOLTAGE V2 [V] | OUTPUT-SIDE POWER CONSUMPTION [W] | OUTPUT CURRENT [A] | LINEAR REGULATOR | | FIRST DC-DC CONVERTER | | SECOND DC-DC CONVERTER | |
|---|---|---|---|---|---|---|---|---|---|---|
| | | | | | CONVERSION EFFICIENCY | CONVERSION LOSS [W] | CONVERSION EFFICIENCY | CONVERSION LOSS [W] | CONVERSION EFFICIENCY | CONVERSION LOSS [W] |
| STANDBY STATE | 5 | 3.3 | 0.1 | 0.03 | 66% | 0.05 | 50% | 0.1 | 50% | 0.1 |
| LOW LOAD OPERATION STATE | 5 | 3.3 | 1 TO 10 | 0.3 TO 3.3 | 66% | 0.5 TO 5.6 | 80% TO 90% | 0.2 TO 1.1 | 53% TO 58% | 0.6 TO 6.6 |
| HIGH LOAD OPERATION STATE | 9 | 3.3 | 20 TO 30 | 6 TO 9 | OUT OF RANGE | — | OUT OF RANGE | — | 85% TO 90% | 3.3 TO 3.5 |

INFORMATION PROCESSING APPARATUS AND STORAGE MEDIUM STORING PROGRAM

CROSS REFERENCE TO RELATED APPLICATIONS

This application claims priority from Japanese Patent Application No. 2018-246990 filed Dec. 28, 2018. The entire content of the priority application is incorporated herein by reference.

TECHNICAL FIELD

This disclosure relates to an information processing apparatus that performs power delivery through an interface, and a storage medium storing a program.

BACKGROUND

Conventionally, for example, there is a power receiving apparatus that receives power from a power supply device by a method compatible with a USB PD (USB Power Delivery) standard. A power receiving apparatus includes a DC-DC converter that supplies charging power to a battery, and a DC-DC converter that converts and outputs the voltage of direct-current power supplied from the battery.

SUMMARY

According to one aspect, this specification discloses an information processing apparatus. The information processing apparatus includes an interface, a convert device, a processing device, and a controller. The interface is configured to perform power delivery and communication with an external apparatus. The convert device is configured to convert a voltage of input power that is supplied from the external apparatus through the interface. The convert device includes a first convert device having first conversion efficiency and a second convert device having second conversion efficiency different from the first conversion efficiency. The processing device is configured to operate by using power converted by the convert device. The controller is configured to switch a conversion state between: a first conversion state of converting, by the first convert device, the input power supplied from the external apparatus through the interface and supplying the converted input power to the processing device; and a second conversion state of converting, by the second convert device, the input power supplied from the external apparatus through the interface and supplying the converted input power to the processing device.

According to another aspect, this specification also discloses an information processing apparatus. The information processing apparatus includes an interface, a convert device, a processing device, and a controller. The interface is configured to perform power delivery and communication with an external apparatus. The convert device is configured to convert a voltage of input power that is supplied from the external apparatus through the interface. The processing device is configured to operate by using power converted by the convert device. The controller is configured to output a control signal to the convert device. The convert device has: a first conversion state of converting the input power with first conversion efficiency and supplying the converted input power to the processing device; and a second conversion state of converting the input power with second conversion efficiency different from the first conversion efficiency and supplying the converted input power to the processing device. The controller is configured to switch a conversion state of the convert device between the first conversion state and the second conversion state based on the control signal.

According to still another aspect, this specification also discloses a non-transitory computer-readable storage medium storing a set of program instructions for controlling an information processing apparatus. The information processing apparatus includes a controller, an interface configured to perform power delivery and communication with an external apparatus, a convert device configured to convert a voltage of input power that is supplied from the external apparatus through the interface, the convert device including a first convert device having first conversion efficiency and a second convert device having second conversion efficiency different from the first conversion efficiency, and a processing device configured to operate by using power converted by the convert device. The set of program instructions, when executed by the controller, causes the information processing apparatus to perform: switching a conversion state between: a first conversion state of converting, by the first convert device, the input power supplied from the external apparatus through the interface and supplying the converted input power to the processing device; and a second conversion state of converting, by the second convert device, the input power supplied from the external apparatus through the interface and supplying the converted input power to the processing device.

According to still another aspect, this specification also discloses a non-transitory computer-readable storage medium storing a set of program instructions for controlling an information processing apparatus. The information processing apparatus includes a controller, an interface configured to perform power delivery and communication with an external apparatus, a convert device configured to convert a voltage of input power that is supplied from the external apparatus through the interface, and a processing device configured to operate by using power converted by the convert device. The set of program instructions, when executed by the controller, causes the information processing apparatus to perform: outputting a control signal to the convert device; and switching a conversion state of the convert device between a first conversion state and a second conversion state based on the control signal. The first conversion state is a state of converting the input power with first conversion efficiency and supplying the converted input power to the processing device. The second conversion state is a state of converting the input power with second conversion efficiency different from the first conversion efficiency and supplying the converted input power to the processing device.

The contents disclosed in this specification may be implemented as an information processing apparatus as well as a control method of controlling an information processing apparatus and a program executable on a computer that controls an information processing apparatus.

BRIEF DESCRIPTION OF THE DRAWINGS

Embodiments in accordance with this disclosure will be described in detail with reference to the following figures wherein.

DETAILED DESCRIPTION

In the above-described power receiving apparatus, power loss occurs in conversion by the DC-DC converter. Hence, it is an issue for an apparatus that uses received power to reduce power loss at the time of conversion.

In view of the foregoing, an example of an object of this disclosure is to provide an information processing apparatus configured to efficiently convert received power (input power) that is supplied, and a storage medium storing a program.

Some aspects of this disclosure will be described while referring to the attached drawings.

Hereinafter, a portable printer 1 according to a first embodiment embodying an information processing apparatus of this disclosure will be described while referring to FIG. 1.

1. Configuration of Portable Printer

Figure 1:
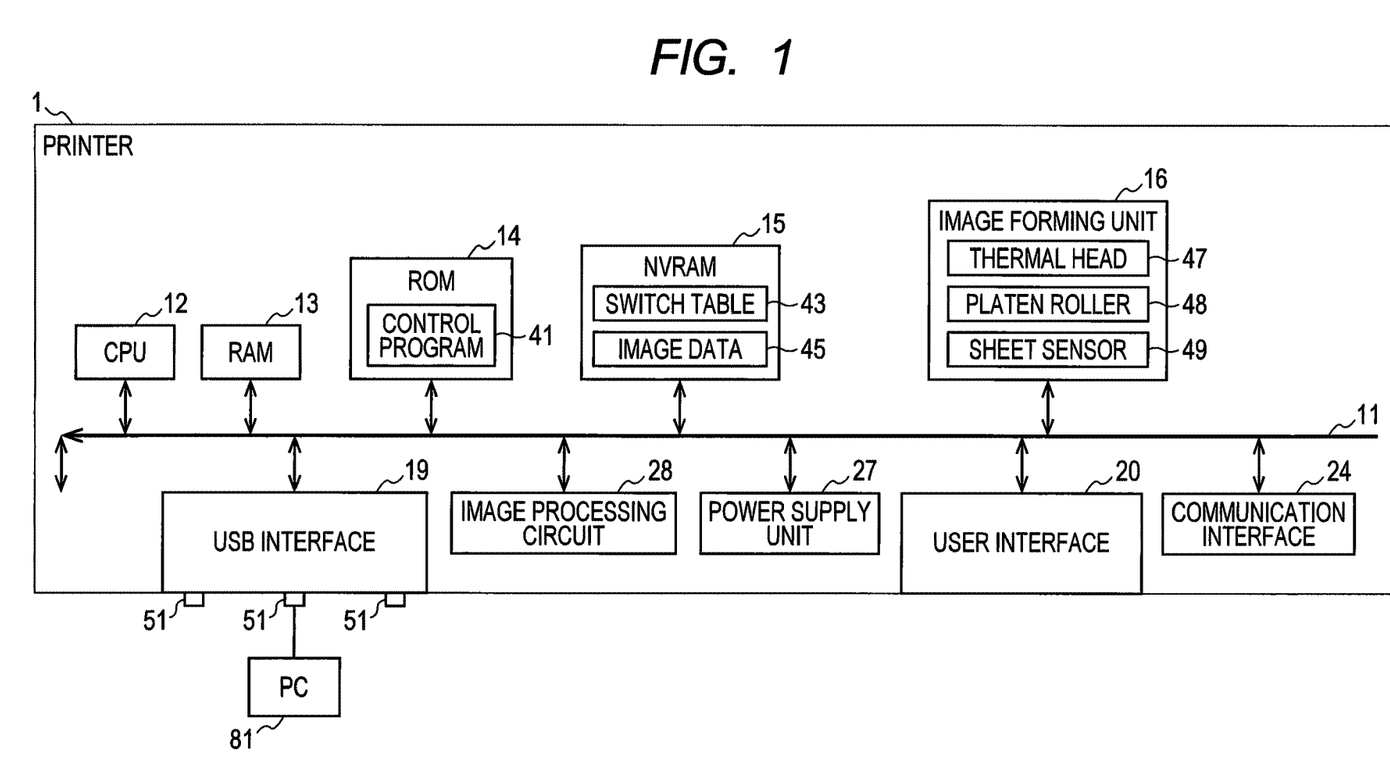
FIG. 1 is a block diagram of a printer according to a first embodiment.

FIG. 1 shows the electrical configuration of the portable printer 1 of the embodiment. For example, the printer 1 is a portable printing apparatus that can be carried, and prints image data of a print job received from a PC, a smart phone, and so on through wired communication or wireless communication on a particular sheet (thermal paper and so on). The printer 1 includes a CPU 12, a RAM 13, a ROM 14, an NVRAM 15, an image forming unit 16, a USB interface 19, a user interface 20, a communication interface 24, a power supply unit 27, an image processing circuit 28, and so on. These components such as the CPU 12 are connected to each other through a bus 11. The image processing circuit 28 is a circuit for performing data processing, decompression processing, and so on of image data relating to a received print job.

For example, the ROM 14 is a non-volatile memory such as a flash memory, and stores various programs such as a control program 41. For example, the CPU 12 performs the control program 41 read out from the ROM 14 and starts up the system of the printer 1. The NVRAM 15 is a non-volatile memory. The NVRAM 15 stores a switch table 43 and image data 45. The above-mentioned storage place of data is just an example. For example, the control program 41 may be stored in the NVRAM 15. The switch table 43 may be stored in the ROM 14. The memory that stores the control program 41 is not limited to a ROM, but may be a flash memory and so on. The memory that stores the control program 41 may be a computer-readable storage medium. As the computer-readable storage medium, a storage medium such as a CD-ROM and a DVD-ROM may be adopted in addition to the above example.

For example, the control program 41 is a firmware that performs overall control of each unit of the printer 1. The CPU 12 executes the control program 41 and controls each unit connected through the bus 11 while temporarily storing the processing results in the RAM 13. As will be described later, the switch table 43 includes information for switching convert devices such as a first DC-DC converter 32 (see FIG. 2). For example, the image data 45 is image data of a print job that is received from a PC, a smartphone, and so on through wired communication or wireless communication. In the following descriptions, the CPU 12 that executes the control program 41 may be simply referred to as "the CPU 12". For example, in some cases, "the CPU 12" specifically means "the CPU 12 that executes the control program 41".

For example, the image forming unit 16 includes a line-type (linear-type) thermal head 47, and prints an image on a sheet by a direct thermal method based on control by the CPU 12. The image forming unit 16 conveys a sheet by rotating a platen roller 48 provided to face the thermal head 47. For example, when a sheet is inserted in an insertion opening of the printer 1 at the start of printing, the inserted sheet is guided to a part at which the platen roller 48 and the thermal head 47 face each other, and is discharged from a discharge opening after printing is finished. The image forming unit 16 includes a sheet sensor 49 that detects insertion and discharge of a sheet. The CPU 12 controls conveyance of a sheet by the image forming unit 16, based on a detection signal of the sheet sensor 49.

For example, the USB interface 19 is an interface that performs communication and power delivery compatible with the USB PD (USB Power Delivery) standard. For example, the USB interface 19 includes three receptacles 51 as connectors. The USB interface 19 performs data communication and power delivery with various external apparatuses connected to the receptacles 51. As shown in FIG. 1, the external apparatus that is connected is a personal computer (PC) 81, for example. As the external apparatus that is connected, various apparatuses that can be connected by the USB standard may be adopted, such as a smart phone, a digital camera, and an external hard disk drive, in addition to the PC 81.

For example, the receptacle 51 is a connector that is compatible with the USB Type-C standard. Each receptacle 51 includes a plurality of pins for performing data communication and power delivery. As the plurality of pins, for example, the receptacle 51 includes a TX pin, an RX pin, a D pin, a Vbus, a CC pin, and so on, in the connector of the USB Type-C standard. For example, the receptacle 51 performs data communication by using any of the TX pin, the RX pin, and the D pin. The receptacle 51 supplies and receives power by using the Vbus pin.

For example, the CC pin is a pin used for determining the power role, and includes a CC1 pin and a CC2 pin for two sides of a plug connected to the receptacle 51. Each receptacle 51 has a dual role power (DRP) function of switching between a power source that is the power role of supplying power (a supply source of power) and a power sink that is the power role of receiving power (a supply target of power).

Figure 2:
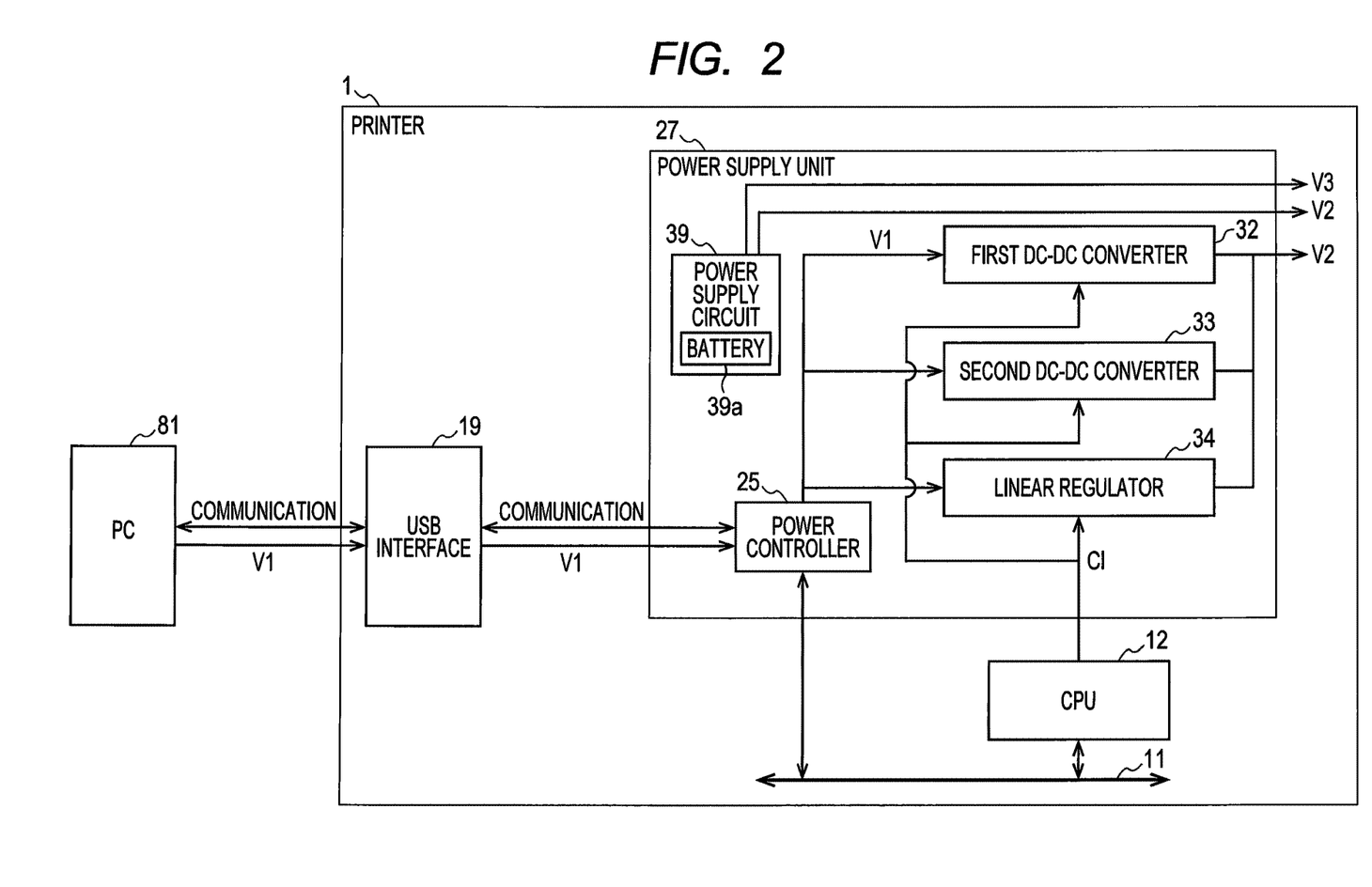
FIG. 2 is a block diagram showing the configuration of a power supply unit according to the first embodiment.

As shown in FIG. 2, the power supply unit 27 includes a power supply circuit 39, a power controller 25, a first DC-DC converter 32, a second DC-DC converter 33, a linear regulator 34, and so on. The power supply circuit 39 functions as a power supply for each device within the printer 1 to supply power to each device. The power supply circuit 39 includes, for example, a battery 39a, a bridge diode and a smoothing circuit, generates direct-current voltages (power) from power supplied from the battery 39a and supplies the voltages (power) to each section of the printer 1. Specifically, the power supply circuit 39 supplies the power of an output voltage V2 and the power of an output voltage V3 to each section. The voltage value of the output voltage V2 is, for example, 3.3V. The voltage value of the output voltage V3 is, for example, greater than that of the output voltage V2. The power of the output voltage V2 is used as the internal power supply of the printer 1. The internal power supply described here refers to a power supply that is used in ICs and circuits that are operated at a low voltage such as the CPU 12, the image processing circuit 28, a circuit board on which the CPU 12 is mounted, various types of sensors and a microcomputer. An example of various types of sensors is the sheet sensor 49 of the image formation portion 16. The power of the output voltage V3 is supplied to a motor that drives the thermal head 47 and the platen roller 48 and so on. A method of charging the battery 39*a* is not particularly limited. For example, the printer 1 may include an AC cord for connecting the power supply circuit 39 to an external AC power supply. In this case, the power supply circuit 39 may charge the battery 39*a* with power received from the AC power supply. Alternatively, the power supply circuit 39 may charge the battery 39*a* with an input voltage V1 that is supplied from the PC 81 through the USB interface 19 described later. The power supply circuit 39 may charge the battery 39*a* by using both the power from the AC power supply and the power of the input voltage V1.

The power controller 25 controls power delivery through the USB interface 19. The power controller 25 performs communication related to power delivery with the external apparatus connected to the USB interface 19 (receptacle 51). The communication related to power delivery includes, for example, communication related to the transmission and reception of power supply information on the device and negotiations for power delivery. The negotiations described here refer to, for example, processing that performs the setting of the power role, the setting of the amounts of power transmitted and received and so on. The power role refers to the power source that functions as a supply source for supplying power or the power sink that receives power from the power source. Although in FIG. 2 the power controller 25 is shown as an integral block, the power controller 25 may separately include a block that receives power through the USB interface 19 and a block that performs the communication related to power delivery through the USB interface 19.

The power controller 25 receives the direct-current input voltage V1 from the PC 81 serving as the external apparatus by power delivery in accordance with the USB PD standard. The power controller 25 supplies the input voltage V1 received through the USB interface 19 to the first DC-DC converter 32, the second DC-DC converter 33, and the linear regulator 34. Hence, the power supply unit 27 supplies the direct-current voltage from the power controller 25 to the first DC-DC converter 32 and so on. The power supply unit 27 changes, based on the control of the CPU 12, the amount of power supplied from the power controller 25 to the first DC-DC converter 32 and so on. In the following description, the first DC-DC converter 32, the second DC-DC converter 33, and the linear regulator 34 may be collectively referred to as convert devices.

The first DC-DC converter 32, the second DC-DC converter 33, and the linear regulator 34 are the convert devices that convert the direct-current voltage (such as the input voltage V1) supplied from the power controller 25 to the direct-current output voltage V2. Hence, in the printer 1 of the embodiment, the power of the output voltage V2 used as the power of the internal power supply is generated in the power supply circuit 39 and each convert device. In the following description, in the connection configuration of the three convert devices, the side of the input voltage V1 may be referred to as the input side, and the side of the output voltage V2 may be referred to as the output side.

Conversion efficiencies and conversion losses in the conversion operation of the three convert devices described above are varied according to, for example, power consumption (load) at the output side that is the side of the output voltage V2. The conversion efficiencies and the conversion losses of the three convert devices are different from each other. The conversion efficiencies and the conversion losses of the convert devices will be described later.

The CPU 12 outputs a control signal CI to each of the three convert devices, thereby changing the convert device that outputs the output voltage V2. Each of the three convert devices starts an operation in response to an input of a high-level control signal CI, and stops the operation in response to an input of a low-level control signal CI, for example. The CPU 12 changes the signal levels of the control signals CI outputted to the convert devices, thereby outputting the output voltage V2 from any one of the three convert devices. A method of switching the three convert devices is not limited to the method using the control signal CI. For example, a configuration may be adopted in which a switch is arranged at the input side of each of the three convert devices, the turning on and off of each of the switches are switched and thus the input of the input voltage V1 is switched so as to switch the convert devices. The CPU 12 may also cause a plurality of convert devices to operate concurrently and to simultaneously output the output voltages V2 from the plurality of convert devices.

The user interface 20 shown in FIG. 1 is a touch panel, for example, and includes an LCD panel, a light source such as LED that emits light from the back side of the LCD panel, a contact sensing film affixed to the front surface of the LCD panel, and so on. The user interface 20 receives an operation to the printer 1, and outputs a signal depending on the operation input to the CPU 12. The user interface 20 also displays information relating to the printer 1. The user interface 20 changes the display content of the LCD panel based on control by the CPU 12.

The communication interface 24 is configured to perform wired communication and wireless communication. The printer 1 receives a print job by the communication interface 24 through wired LAN or wireless communication. The CPU 12 controls the communication interface 24, and receives a print job (the image data 45 and so on) through wired communication or wireless communication. The printer 1 receives a print job by data communication of the USB interface 19. The CPU 12 controls the image forming unit 16 to perform printing based on the received print job.

2. Configuration of Switch Table 43

Figure 3:
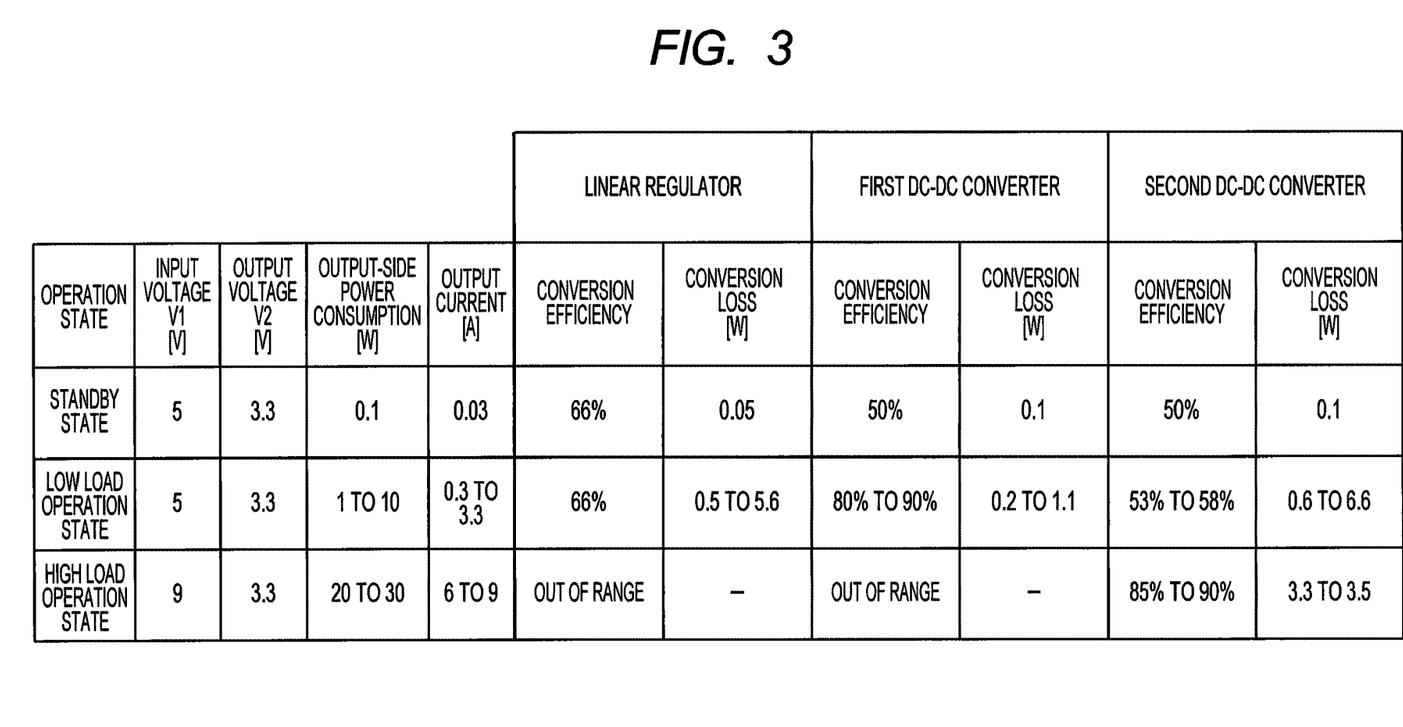
FIG. 3 is a table showing the contents of a switch table.

The configuration of the switch table 43 will then be described with reference to FIGS. 3 and 4. As shown in FIG. 3, in the switch table 43, three states that are a standby state, a low load operation state, and a high load operation state are set. The input voltage V1 and the output voltage V2 shown in FIG. 3 respectively indicate voltages at the input side and the output side of the convert devices shown in FIG. 2. The output-side power consumption is power that is consumed at the output side, and is power that is consumed in ICs and so on utilizing the internal power supply such as the CPU 12 and the sheet sensor 49. The output current is a total value of currents which flow through the CPU 12 and so on at the output side. The conversion (voltage conversion) efficiency indicates the efficiency of the conversion operation in the convert device. The efficiency described here is, for example, a value (=V2/V1) obtained by dividing the output voltage V2 by the input voltage V1. The conversion loss indicates the loss of the conversion operation in the convert device. The loss described here is, for example, a value (=V1−V2) obtained by subtracting the output voltage V2 from the input voltage V1.

The standby state shown in FIG. 3 is, for example, an operation state where the power consumption of the printer 1 is reduced. The CPU 12 sets the printer 1 to the standby state when the duration in which the print job is not received exceeds certain duration. In the standby state, for example, the CPU 12 stops the rotation of the platen roller 48 and lowers the temperature of the heating member of the thermal head 47 below a temperature at the time of printing, thereby reducing the power consumption of the printer 1 as compared with the time when the printing is performed. In the standby state, the CPU 12 decreases the supply power to the ICs and the circuits that are operated at a low voltage such as the circuit board on which the CPU 12 is mounted, various types of sensors, and the microcomputer to below the supply power at the time of printing.

The low load operation state is, for example, an operation state where the power consumption at the output side of the convert devices is lower than that in the high load operation state. For example, the processing load of the CPU 12, the image processing circuit 28, and so on that use the power of the output voltage V2 increases as the resolution of the printing increases. Hence, the power consumption of the CPU 12, the image processing circuit 28, and so on increases as the resolution increases. The CPU 12 determines, for example, based on a resolution set in the print job, to which one of the low load operation state and the high load operation state the operation state is shifted when the printing is started. Then, when the CPU 12 detects a shift of the operation state between the three operation states which are the standby state, the low load operation state, and the high load operation state, the CPU 12 performs control so as to switch to the convert device whose conversion efficiency is higher, out of the three convert devices (see FIG. 5)

Specifically, as shown in FIG. 3, the output-side power consumption in the standby state is, for example, 0.1 W. The output-side power consumption in the low load operation state is, for example, 1 to 10 W. The output-side power consumption in the high load operation state is, for example, 20 to 30 W. Hence, the output-side power consumption (the load at the output side) increases in the order of the standby state, the low load operation state, and the high load operation state.

As shown in FIG. 3, the conversion efficiencies and the conversion losses of the three convert devices differ according to the operation state, that is, according to the magnitude of the output-side power consumption. The description of "out of range" in FIG. 3 indicates that even when the set input voltage V1 is inputted, the corresponding convert device does not generate the required output voltage V2 and output current.

Figure 4:
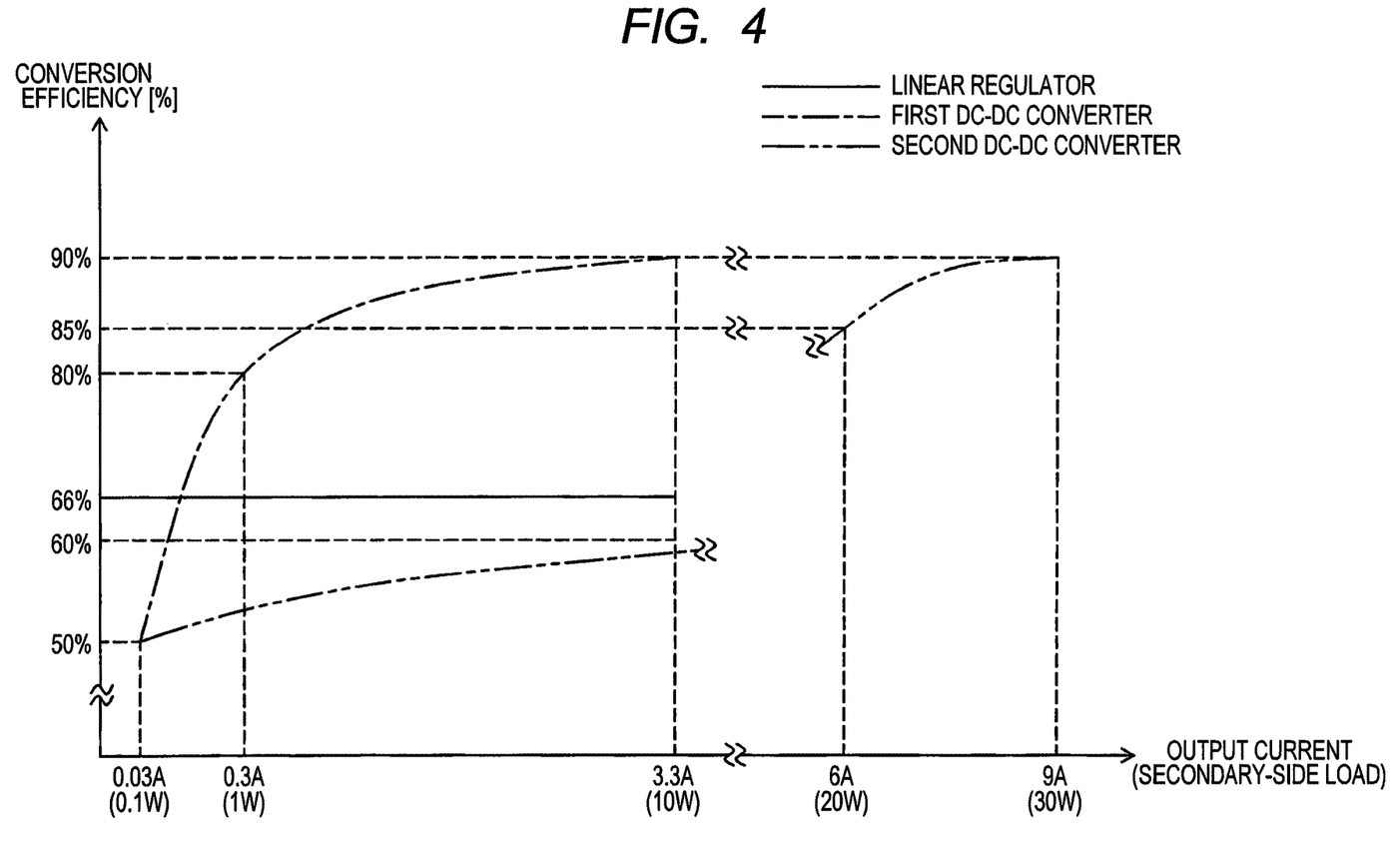
FIG. 4 is a graph showing the relationship between output current and conversion efficiency of a first DC-DC converter, a second DC-DC converter, and a linear regulator.

For example, as shown in FIG. 4, in the linear regulator 34, the range of the output current is a range of 0 to 3.3 A, and the linear regulator 34 has a circuit configuration that does not cover the high load operation state in which the output current is greater than the range described above. When the output current is within the range, the linear regulator 34 is configured to convert voltage from the input voltage V1 to the output voltage V2 at a constant conversion efficiency of 66%.

In the first DC-DC converter 32, for example, the range of the output current is a range of 0.03 to 3.3 A, and the first DC-DC converter 32 has a circuit configuration that does not cover the high load operation state. The conversion efficiency of the first DC-DC converter 32 increases as the output current increases. Hence, the conversion efficiency (80 to 90%) of the first DC-DC converter 32 in the low load operation state (where the output current is 0.3 to 3.3 A) is higher than the conversion efficiency (50%) in the standby state (where the output current is 0.03 A).

In the second DC-DC converter 33, for example, the range of the output current is a range of 0.03 to 9 A, and the second DC-DC converter 33 has a circuit configuration that covers all the operation states. The conversion efficiency of the second DC-DC converter 33 increases as the output current increases. The conversion efficiency of the second DC-DC converter 33 increases in the order of the standby state (50%), the low load operation state (53 to 58%), and the high load operation state (85 to 90%).

The second DC-DC converter 33 uses a high frequency as the switching frequency in order to improve the following-ness of voltage fluctuations even in a case where the load at the output side fluctuates significantly and thus significant voltage fluctuations are produced as in the high load operation state, for example. In this way, the second DC-DC converter 33 performs high-efficient conversion in the high load operation state. On the other hand, since the second DC-DC converter 33 uses a high switching frequency, when voltage fluctuations are relatively small as in the low load operation state and the standby state, thermal loss and so on are increased by the excessive switching operation. The conversion efficiency of the second DC-DC converter 33 is relatively low in the low load operation state and the standby state. Consequently, the conversion efficiency of the second DC-DC converter 33 is low in the low load operation state as compared with the first DC-DC converter 32 which is designed for small voltage fluctuations. Likewise, the conversion efficiency of the second DC-DC converter 33 is low in the standby state as compared with the linear regulator 34. Hence, the CPU 12 of the embodiment refers to the conversion efficiencies of the switch table 43 shown in FIG. 3 and selects the convert device having higher conversion efficiency depending on the shift of the operation state.

3. Convert Device Selection Control

Next, convert device selection control of selecting a convert device (convert circuit) executed by the printer 1 of the embodiment will be described while referring to FIG. 5. When the power of the printer 1 is turned on, for example, the CPU 12 executes the control program 41 stored in the ROM 14 to start up the system of the printer 1, and then starts the convert device selection control shown in FIG. 5. A flowchart in this specification basically indicates processing by the CPU 12 in accordance with instructions described in a program. That is, processing such as "judge", "switch", and "determine" in the following description indicates processing by the CPU 12. The processing by the CPU 12 also includes hardware control. The convert device selection control shown in FIG. 5 may be performed by a device other than the CPU 12. For example, the power controller 25 may execute the convert device selection control shown in FIG. 5.

Figure 5:
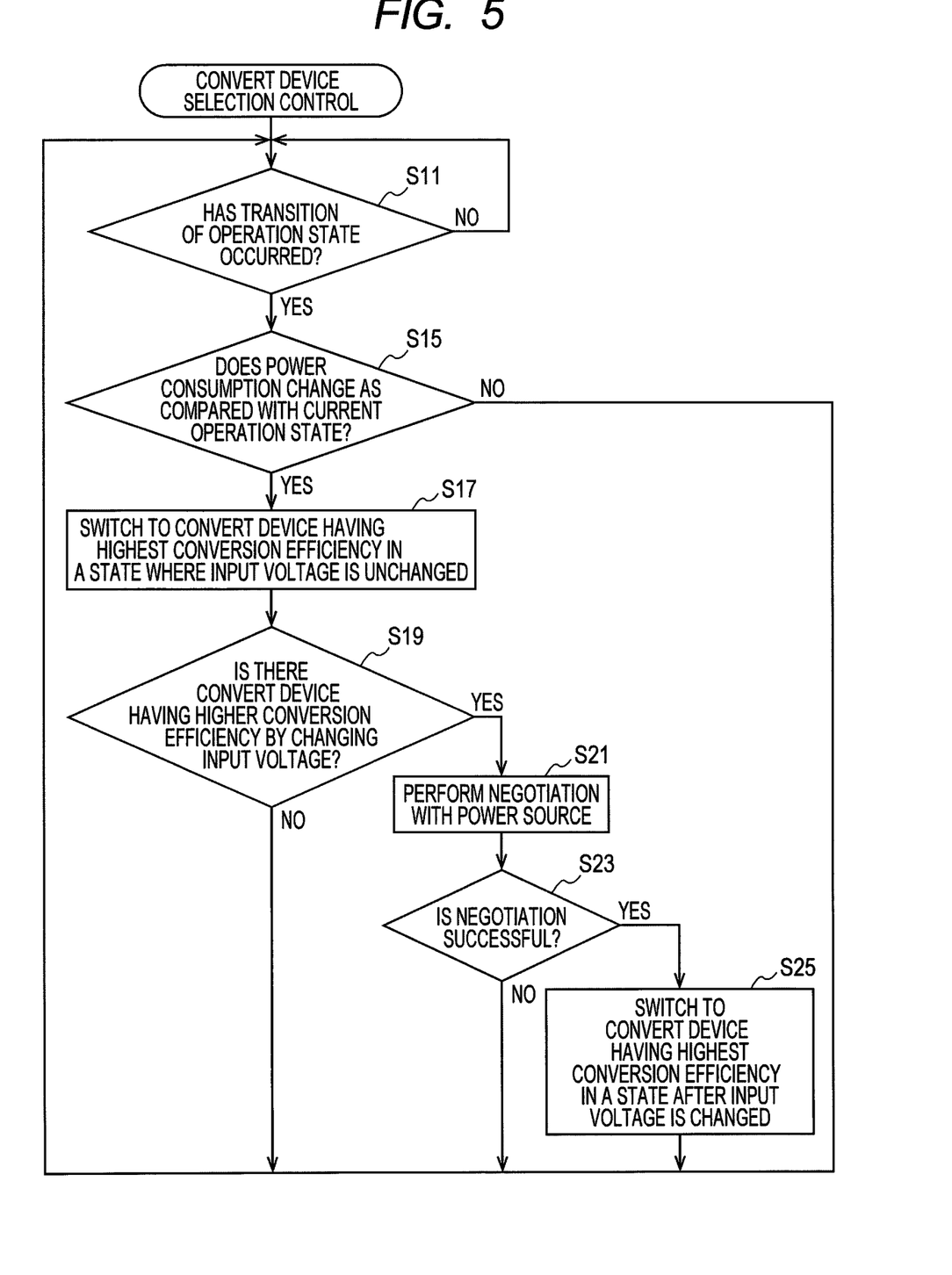
FIG. 5 is a flowchart showing the contents of convert device selection control.

The CPU 12 executes the convert device selection control of FIG. 5 based on a transition of the operation state so as to switch the convert devices. In the following discussion, a plurality of state transitions in which the operation state shifts will be described with reference to the flowchart of FIG. 5. First, as a first state transition, a state transition from the standby state to the low load operation state will be described. In the standby state before the transition, it is assumed that the linear regulator 34 is operating. In the convert device selection control described below, for example, a state is assumed where sufficient power is not supplied from the power supply circuit 39 shown in FIG. 2 to the CPU 12, the image processing circuit 28, and so on. In this case, the CPU 12 needs to acquire power through the USB interface 19. Here, the "state where sufficient power is not supplied" refers to, for example, a "state where the remaining amount in the battery 39a is small and thus it is difficult to acquire, from the remaining amount in the battery 39a, power supplied to all the devices (loads) of the printer 1". In such a state, the printer 1 of the embodiment acquires the power of the output voltage V2 supplied to the CPU 12, the image processing circuit 28, and so on through the USB interface 19.

<3-1. Transition from Standby State to Low Load Operation State>

In step S11 ("step" is hereinafter simply referred to as "S") of FIG. 5, the CPU 12 of the printer 1 first determines whether the transition of the operation state occurs. The CPU 12 repeatedly performs the determination processing of S11 until the transition of the operation state is detected (S11: NO). Hence, the CPU 12 periodically monitors the transition of the operation state after the system of the printer 1 is started up.

In the low load operation state, as described above, as compared with the high load operation state, the output-side power consumption is low. The CPU 12 detects the transition of the operation state based on, for example, the setting of the print job received in the standby state. For example, when the CPU 12 receives a print job in which a resolution lower than or equal to a particular resolution is set, that is, a print job in which the processing load is low and in which the output-side power consumption is low, the CPU 12 determines that the operation state is shifted from the standby state to the low load operation state (S11: YES). The condition in which the standby state is shifted to the low load operation state is not limited to the reception of the print job of the low resolution described above. For example, when the CPU 12 receives a print job in which the output-side power consumption is relatively low, such as when the CPU 12 receives a print job of monochrome printing or when the CPU 12 receives a print job of low-speed printing, the CPU 12 may detect the transition to the low load operation state (S11: YES).

When the CPU 12 detects the transition to the low load operation state (S11: YES), the CPU 12 executes S15. In S15, the CPU 12 refers to the switch table 43 and determines whether the output-side power consumption is changed as compared with the current operation state. As shown in FIG. 3, in the embodiment, the output-side power consumption (1 to 10 W) in the low load operation state is higher than the output-side power consumption (0.1 W) in the standby state. Hence, the CPU 12 makes a positive determination in S15 (S15: YES), and executes S17.

As shown in FIG. 3, in the embodiment, the output-side power consumptions in the three operation states are different from each other. Hence, when the transition of the state occurs, the CPU 12 certainly makes a positive determination in S15. However, if two or more operation states have the same output-side power consumption (for example, in a case where there are a normal speed printing state, a monochrome printing state, and so on), the CPU 12 makes a negative determination in S15 (S15: NO) even when the transition of the operation state occurs unless the output-side power consumption is changed, and thereby executes the processing from S11 again. In this case, the convert device is not changed.

In S17, the CPU 12 performs control to switch to the convert device having the highest conversion efficiency in a state where the input voltage V1 is not changed. The printer 1 of the embodiment uses the PC 81 connected to the USB interface 19 as the power source so as to receive power by a method compatible with the USB PD standard. Then, the CPU 12 controls the power controller 25 to perform negotiations with the power source such as the PC 81. When the negotiations are successful, the printer 1 receives desired power from the power source.

For example, in the method compatible with the USB PD standard, power can be received from the power source in a range of the amount of power from 2.5 W (5V, 0.5 A) to 100 W (20V, 5 A). The CPU 12 receives, from the PC 81, a power list of combinations of voltage values and current values that can be supplied, for example, within the range of the amount of power described above. The CPU 12 requests the PC 81 to supply necessary power (the input voltage V1) out of the received power list.

In S17, the CPU 12 determines whether the conversion efficiency improves by changing the convert device while keeping the input voltage V1 constant without requesting the PC 81 to change the input voltage V1. In this way, if the negotiations described later are unsuccessful and the input voltage V1 cannot be changed, the CPU 12 switches to the convert device having the highest conversion efficiency while keeping the current input voltage V1.

As shown in FIG. 3, in the standby state before the transition, the input voltage V1 is 5V. In the standby state, the CPU 12 receives, for example, the lowest power of 2.5 W (5V, 0.5 A) which can be received from the PC 81. When the operation state shifts from the standby state to the low load operation state, the output-side power consumption increases to a range of 1 to 10 W. Hence, the CPU 12 selects the convert device having the highest conversion efficiency from among the convert devices that can be operated with the input voltage V1 of 5V in the range of the output-side power consumption (1 to 10 W) in the operation state after the transition. As shown in FIG. 3, in the low load operation state, the conversion efficiency (80 to 90%) of the first DC-DC converter 32 is higher than the conversion efficiency (66%) of the linear regulator 34. Hence, the CPU 12 refers to the switch table 43 and determines that the convert device having the input voltage V1 of 5V and having the highest conversion efficiency in the low load operation state is the first DC-DC converter 32. In S17, the CPU 12 performs control to switch, based on the control signal CI, the convert device from the linear regulator 34 to the first DC-DC converter 32.

The CPU 12 may select the convert device based on a criterion other than the conversion efficiency. For example, the CPU 12 may select the convert device based on the loss. As shown in FIG. 3, the three convert devices of the embodiment have a relationship where, by selecting a convert device having higher conversion efficiency, a convert device having a lower loss can be selected. However, in a case where the convert device cannot be determined only by the conversion efficiency such as when the ranges of conversion efficiencies of the convert devices overlap each other, the CPU 12 may refer to, for example, the conversion loss to select the convert device. Alternatively, the CPU 12 may select the convert device based on only the conversion loss. Hence, the switch table 43 may include only one of the conversion efficiency and the conversion loss.

Then, in S19, the CPU 12 determines whether there is a convert device having higher conversion efficiency by changing the input voltage V1. As shown in FIG. 3, in the switch table 43 of the embodiment, there is no low load operation state in which the input voltage V1 is changed from 5V (for example, a low load operation state in which the input voltage V1 is 9V). Hence, the CPU 12 makes a negative determination in S19 (S19: NO), and executes the processing from S11 again. In this way, when the operation state shifts from the standby state to the low load operation state, the CPU 12 switches the convert device to the first DC-DC converter 32 to improve the conversion efficiency.

For example, a case is considered where a DC-DC converter is connected whose conversion efficiency increases beyond the first DC-DC converter 32 by setting the input voltage V1 to 9V in the low load operation state. In this case, the CPU 12 makes a positive determination in S19 and executes S21 and subsequent steps, thereby switching the convert devices. In this way, the input voltage V1 is changed, and thus the conversion efficiency is improved. The case where S21 and subsequent steps are executed will be described later.

<3-2. Transition from Standby State to High Load Operation State>

Control when the operation state shift from the standby state to the high load operation state will be described. In the following discussion, the description of the same details as the above-described control when shifting from the standby state to the low load operation state will be omitted.

In S11, the CPU 12 detects the transition from the standby state to the high load operation state. For example, when the output-side power consumption increases in the standby state such as when the CPU 12 receives a print job having a resolution that is higher than or equal to a particular resolution or when the CPU 12 receives a print job having the number of colors larger than or equal to a particular number of colors, the CPU 12 determines that the operation state shifts from the standby state to the high load operation state (S11: YES).

As shown in FIG. 3, the output-side power consumption in the high load operation state is higher than that in the standby state. Hence, in S15, the CPU 12 refers to the switch table 43 and makes a positive determination (S15: YES). In S17, the CPU 12 selects the convert device having the highest conversion efficiency from among the convert devices that can operate with the input voltage V1 of 5V in the range of the output-side power consumption (20 to 30 W) in the operation state after the transition. The first DC-DC converter 32 of the embodiment is out of range in the high load operation state, but has higher conversion efficiency than the linear regulator 34 when the input voltage V1 is 5V and the output-side power consumption (the load at the output side) increases. Hence, the CPU 12 refers to the switch table 43 and determines that the convert device having higher conversion efficiency is the first DC-DC converter 32. In S17, the CPU 12 performs control to switch the convert device from the linear regulator 34 to the first DC-DC converter 32.

Then, in S19, the CPU 12 determines whether there is a convert device having higher conversion efficiency by changing the input voltage V1. As shown in FIG. 3, in the switch table 43 of the embodiment, when the input voltage V1 is changed to 9V and the second DC-DC converter 33 is used in the high load operation state, the conversion efficiency improves to a range of 85 to 90%. Hence, the CPU 12 makes a positive determination in S19 (S19: YES) and executes S21.

In S21, the CPU 12 controls the power controller 25 to perform negotiations with the PC 81. The power controller 25 performs, based on the control of the CPU 12, negotiations for requesting the PC 81 to supply the input voltage V1 of 9V. The power controller 25 notifies the CPU 12 about the result of the response from the PC 81.

In S23, the CPU 12 determines the result of the negotiations received from the power controller 25. When the CPU 12 determines that the negotiations are unsuccessful, that is, when the input voltage V1 of 9V is not supplied from the PC 81 (S23: NO), the CPU 12 executes the processing from S11. In this way, even if the negotiations for changing the input voltage V1 are unsuccessful, in S17 the CPU 12 switches the convert device to the first DC-DC converter 32, and thus the conversion efficiency is improved.

When in S23 the CPU 12 determines that the negotiations are successful (S23: YES), the CPU 12 switches to the convert device having the highest conversion efficiency after the input voltage V1 is changed, that is, the second DC-DC converter 33 (S25). The second DC-DC converter 33 starts its operation based on the control of the CPU 12. The power controller 25 supplies the input voltage V1 of 9V received from the PC 81 to the second DC-DC converter 33. In this way, in the high load operation state after the transition, the conversion efficiency is improved.

<3-3. Transition from Low Load Operation State to Standby State>

In the two examples described above, the cases where the output-side power consumption increases are described. A description will be given about the control when the operation state shifts from the low load operation state to the standby state, that is, when the output-side power consumption is reduced. In the low load operation state before the transition, it is assumed that the first DC-DC converter 32 is operating.

In S11, the CPU 12 detects the transition from the low load operation state to the standby state. For example, the CPU 12 determines that the operation state shifts from the low load operation state to the standby state, in a case where printing based on a print job is completed and thereafter no print job is received for a certain duration or longer in the low load operation state (S11: YES).

As shown in FIG. 3, the output-side power consumption in the standby state is smaller than that in the low load operation state. Hence, in S15, the CPU 12 refers to the switch table 43 and makes a positive determination (S15: YES). In S17, the CPU 12 selects the convert device having the highest conversion efficiency from among the convert devices that can operate with the input voltage V1 of 5V in the range of the output-side power consumption (0.1 W) in the operation state after the transition. In a case where the input voltage V1 is 5V and the output-side power consumption is decreased, the linear regulator 34 of the embodiment has higher conversion efficiency than the first DC-DC converter 32. Hence, the CPU 12 refers to the switch table 43 and determines that the convert device having higher conversion efficiency is the linear regulator 34. In S17, the CPU 12 switches the convert device from the first DC-DC converter 32 to the linear regulator 34.

Then, in S19, the CPU 12 determines whether there is a convert device having higher conversion efficiency by changing the input voltage V1. As shown in FIG. 3, in the switch table 43 of the embodiment, there is no setting in which the input voltage V1 is lower than 5V. Hence, the CPU 12 makes a negative determination in S19 (S19: NO) and executes the processing from S11 again. In this way, the convert device is switched from the first DC-DC converter 32 to the linear regulator 34 in conjunction with the transition to the standby state, thereby improving the conversion efficiency.

<3-4. Transition from High Load Operation State to Standby State>

A description will be given for the control when shifting from the high load operation state to the standby state. In the high load operation state before the transition, it is assumed that the second DC-DC converter 33 is operating. It is also assumed that the printer 1 is supplied with the input voltage V1 of 9V from the PC 81.

For example, the CPU 12 determines that the operation state shifts from the high load operation state to the standby state, in a case where printing is completed and thereafter no print job is received for a certain duration or longer in the high load operation state (S11: YES). As shown in FIG. 3, the output-side power consumption in the standby state is lower than that in the high load operation state. Hence, in S15, the CPU 12 refers to the switch table 43 and makes a positive determination (S15: YES).

In S17, the CPU 12 selects the convert device having the highest conversion efficiency from among the convert devices that can operate with the input voltage V1 of 9V in the range of the output-side power consumption (0.1 W) in the operation state after the transition. In the embodiment, when the input voltage V1 is 9V, the first DC-DC converter 32 and the linear regulator 34 are out of range, and only the second DC-DC converter 33 can operate (see FIGS. 3 and 4). Hence, in S17, the CPU 12 does not detect, from the switch table 43, a convert device having higher conversion efficiency than that of the current second DC-DC converter 33, and thus does not switch the convert devices.

Then, in S19, the CPU 12 determines whether there is a convert device having higher conversion efficiency by changing the input voltage V1. As shown in FIG. 3, the conversion efficiencies of the first DC-DC converter 32 and the second DC-DC converter 33 are 50% when the input voltage V1 is 5V and the output-side power consumption is 0.1 W (in the case of the standby state). On the other hand, the conversion efficiency of the linear regulator 34 is 66% when the input voltage V1 is 5V and the output-side power consumption is 0.1 W. Hence, the CPU 12 makes a positive determination in S19 (S19: YES) and executes S21. Although not shown in FIG. 3, even if the input voltage V1 is maintained to be 9V, when the output-side power consumption is 0.1 W in the standby state, the conversion efficiency of the second DC-DC converter 33 of the embodiment is lower than the conversion efficiency (66%) of the linear regulator 34.

In S21, the CPU 12 controls the power controller 25 to perform negotiations with the PC 81. The power controller 25 performs, based on the control of the CPU 12, negotiations for requesting the PC 81 to supply the input voltage V1 of 5V. When in S23 the CPU 12 determines that the negotiations are unsuccessful, that is, when the input voltage V1 of 5V is not supplied from the PC 81 (S23: NO), the CPU 12 executes the processing from S11. In this case, the second DC-DC converter 33 converts the input voltage V1 of 9V in the standby state. In this way, even if the negotiations are unsuccessful, and thus input voltage V1 is not changed, the second DC-DC converter 33 covering a wide range of the output-side power consumption is operated, thereby generating the output voltage V2 that is needed as the internal power supply.

When in S23 the CPU 12 determines that the negotiations are successful (S23: YES), the CPU 12 switches the convert device to the linear regulator 34 (S25). In this way, in the standby state after the transition, the conversion efficiency is improved.

The printer 1 is a non-limiting example of an information processing apparatus. The CPU 12 is a non-limiting example of a controller and a processing device. The image processing circuit 28 is a non-limiting example of a processing device. The PC 81 is a non-limiting example of an external apparatus. The USB interface 19 is a non-limiting example of an interface. The sheet sensor 49 is a non-limiting example of a processing device and a sensor. The input voltage V1 is a non-limiting example of received power (input power). Each of the first DC-DC converter 32, the second DC-DC converter 33, and the linear regulator 34 is a non-limiting example of a convert device, a first convert device, and a second convert device. That is, the convert device in this disclosure includes converters and linear regulators.

The state of performing conversion by each of the three convert devices is a non-limiting example of a first conversion state and a second conversion state. Thus, a transition (shift) from one of the above-described standby state, low load operation state, high load operation state to another state is a non-limiting example of a transition from a first conversion state to a second conversion state. Although not described in the above-described embodiments of (3-1) to (3-4), a transition from the low load operation state to the high load operation state or a transition from the high load operation state to the low load operation state may be adopted as a transition between the first conversion state and the second conversion state. The examples are a case where the resolution or print speed is changed during execution of printing and a case where print jobs having different resolutions or print speeds are executed successively.

4. Advantageous Effects

According to the above-described first embodiment, the following effects are obtained.

(1) The CPU 12 of the printer 1 in the first embodiment switches, for example, between a state (an example of the first conversion state) where the input voltage V1 supplied from the PC 81 through the USB interface 19 is converted by the linear regulator 34 and is supplied to the CPU 12 and the sheet sensor 49 and a state (an example of the second conversion state) where the input voltage V1 supplied from the PC 81 through the USB interface 19 is converted by the first DC-DC converter 32 and is supplied to the CPU 12 and so on.

The first DC-DC converter 32, the second DC-DC converter 33, and the linear regulator 34 convert the input voltage V1 supplied from the PC 81 to the output voltage V2 which is needed in the CPU 12. The three convert devices such as the first DC-DC converter 32 are different from each other in conversion efficiency. The CPU 12 switches the convert devices to perform the conversion. Hence, depending on the input voltage V1 inputted to the convert device, the output current of the convert device, the output-side power consumption of the convert device, and so on, the CPU 12 switches the convert devices having different conversion efficiencies, thereby efficiently converting the input voltage V1 (input power).

(2) The CPU 12 and so on are configured to switch the operation state, for example, between the standby state (an example of a first state) and the low load operation state (an example of a second state) where the amount of power consumption is greater than that in the standby state. When the CPU 12 and so on are in the low load operation state, the conversion efficiency of the first DC-DC converter 32 is higher than that of the linear regulator 34 (see FIG. 3). In response to a switch from the standby state to the low load operation state, the CPU 12 switches the operation state from a state where the conversion is performed by the linear regulator 34 to a state where the conversion is performed by the first DC-DC converter 32.

In the low load operation state, the conversion efficiency of the first DC-DC converter 32 is higher than that of the linear regulator 34. In response to a switch from the standby state to the low load operation state, the CPU 12 switches the operation state from the state where the conversion is performed by the linear regulator 34 to the state where the conversion is performed by the first DC-DC converter 32, thereby improving the conversion efficiency.

(3) When the CPU 12 and so on are in the standby state, the conversion efficiency of the linear regulator 34 is higher than that of the first DC-DC converter 32 (see FIG. 3). In response to a switch from the low load operation state to the standby state, the CPU 12 switches the operation state from the state where the conversion is performed by the first DC-DC converter 32 to the state where the conversion is performed by the linear regulator 34.

In the standby state, the conversion efficiency of the linear regulator 34 is higher than that of the first DC-DC converter 32. In response to a switch from the low load operation state to the standby state, the CPU 12 switches the operation state from the state where the conversion is performed by the first DC-DC converter 32 to the state where the conversion is performed by the linear regulator 34, thereby improving the conversion efficiency.

(4) In response to determining that the conversion efficiency can be improved by switching the operation state between the state where the conversion is performed by the linear regulator 34 and the state where the conversion is performed by the first DC-DC converter 32 without changing the amount of power of the input voltage V1 supplied from the PC 81 through the USB interface 19, the CPU 12 executes the processing (an example of switching processing) of S17 of switching the convert devices. In this way, the conversion efficiency can be improved by switching the convert devices without requesting the PC 81 to change the amount of power of the input voltage V1.

(5) The CPU 12 executes the processing of S19 (an example of first determination processing) of determining the conversion efficiency can be improved by changing the input voltage V1 supplied from the PC 81 through the USB interface 19 from 5V (an example of a first amount of power) to 9V (an example of a second amount of power), and the processing of S21 of, in response to making a positive determination in the processing of S19 (S19: YES), requesting the PC 81 to supply 9V through the USB interface 19 (an example of requesting processing)

Hence, in a case where the conversion efficiency can be improved by changing the input voltage V1 received from the PC 81 to 9V, the CPU 12 requests the PC 81 to supply the input voltage V1 of 9V. In this way, the input voltage V1 of 9V is received and is supplied to the second DC-DC converter 33, thereby improving the conversion efficiency.

(6) When the input voltage V1 of 9V cannot be received from the PC 81 after executing the processing of S21 (S23: NO), the CPU 12 selects the state where the conversion efficiency is higher from among the state where conversion is performed by the linear regulator 34 and the state where the conversion is performed by the first DC-DC converter 32 (that is, the result of S17 is maintained). That is, when the input voltage V1 of 9V cannot be received from the PC 81, the CPU 12 selects the state where the conversion efficiency is higher from among the state where conversion is performed by the linear regulator 34 and the state where conversion is performed by the first DC-DC converter 32, without changing the input voltage V1. Hence, when the input voltage V1 cannot be changed to an input voltage with which the conversion efficiency can be improved, the convert devices are switched to improve the conversion efficiency, without changing the input voltage V1 of 5V.

(7) The USB interface 19 is an interface that performs power delivery and communication by connection compatible with a USB (Universal Serial Bus) standard. In the printer 1 having an interface that performs power delivery in accordance with the USB PD standard and so on, the change of the input voltage V1 received from the external apparatus can be requested, and the desired input voltage V1 can be utilized as the power supply of the convert device. The combination of the input voltage V1 and the convert device can be changed to improve the conversion efficiency. Hence, in the printer 1 having the interface of the USB standard, it is extremely effective to switch the convert devices having different conversion efficiencies.

(8) The printer 1 includes, as the convert devices, the linear regulator 34 and the first DC-DC converter 32. In this way, the linear regulator 34 and the first DC-DC converter 32 having different conversion efficiencies are switched to improve the conversion efficiency.

(9) The printer 1 includes the second DC-DC converter 33 as the convert device. In this way, in the high load operation state, the second DC-DC converter 33 is utilized, and thus the conversion efficiency is improved.

(10) The printer 1 includes the CPU 12 and the sheet sensor 49 (an example of the sensor). The amounts of power consumption of the CPU 12 and the sheet sensor 49 are varied depending on the processing load of the CPU 12 and the operation state of the sheet sensor 49. Hence, the convert devices are switched depending on the power consumption amounts of the CPU 12 and so on, and thus the convert device having higher conversion efficiency is used depending on the amount of power consumption.

(11) The CPU 12 performs control to form images. The high load operation state (an example of the second state) is a state where images are formed based on control by the CPU 12 at high speed as compared with the low load operation state (an example of the first state) (for example, high-resolution image processing is performed while maintaining a printing speed). In this way, in the high load operation state where high-speed image formation is performed based on control by the CPU 12 and the amount of power consumption of the CPU 12 increases, the second DC-DC converter 33 is utilized to improve the conversion efficiency.

(12) The high load operation state is a state where high-quality images are formed based on control by the CPU 12 as compared with the low load operation state (for example, high-resolution printing is performed). In this way, in the high load operation state where high-quality images are formed based on control by the CPU 12 and the amount of power consumption of the CPU 12 increases, the second DC-DC converter 33 is utilized to improve the conversion efficiency.

5. Second Embodiment

Figure 6:
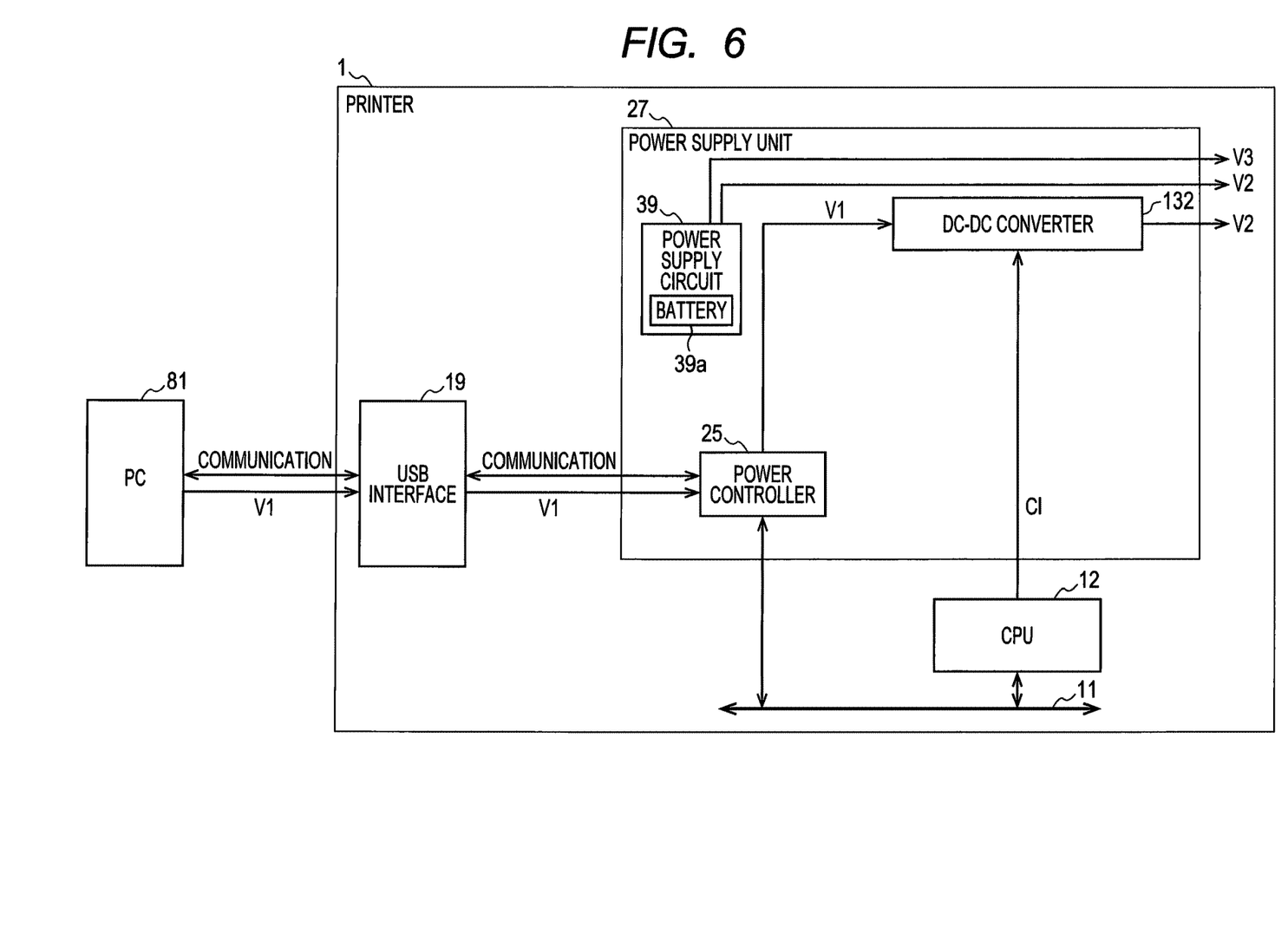
FIG. 6 is a block diagram showing the configuration of a power supply unit according to a second embodiment.

In the first embodiment described above, the power supply unit 27 includes the three convert devices which are the first DC-DC converter 32, the second DC-DC converter 33, and the linear regulator 34. Alternatively, the power supply unit 27 may include only one convert device as shown in FIG. 6.

In the first embodiment, by changing the control signal CI, the CPU 12 select the convert device for performing conversion from among the three convert devices. By contrast, a DC-DC converter 132 shown in FIG. 6 has, for example, a plurality of modes in which switching frequencies are different, and changes the switching frequency depending on the contents of the control signal CI inputted from the CPU 12. By changing the switching frequency, the DC-DC converter 132 realizes, with one convert device, the three convert devices having different conversion efficiencies as in the first embodiment described above. The DC-DC converter 132 may be configured to change the value of the switching frequency itself, without changing the mode based on the control signal CI. Further, the DC-DC converter 132 may change, based on the control signal CI, parameters (the resistance value of an internal circuit and a step-up rate) other than the switching frequency to change the conversion efficiency.

The DC-DC converter 132 changes the conversion efficiency relative to the input voltage V1 and the output-side power consumption, by changing the switching frequency based on the control signal CI, for example. Hence, the CPU 12 switches, based on the control signal CI, the mode of the DC-DC converter 132 to a mode in which conversion efficiency is higher depending on the input voltage V1 and the output-side power consumption of the operation state. By changing the mode of the DC-DC converter 132, the conversion of higher conversion efficiency can be performed in accordance with the transition of the operation state.

Hence, the DC-DC converter 132 of the second embodiment has a state (an example of the first conversion state) where the input voltage V1 is converted with a particular conversion efficiency (an example of first conversion efficiency) and is supplied to the CPU 12 and so on, and a state (an example of the second conversion state) where the input voltage V1 is converted with conversion efficiency (an example of second conversion efficiency) different from the particular conversion efficiency and is supplied to the CPU 12 and so on. The CPU 12 switches the conversion states of the DC-DC converter 132 based on the control signal CI. Thus, the CPU 12 is configured to switch the modes of the DC-DC converter 132 based on the control signal CI. Hence, the CPU 12 switches the modes in which conversion efficiencies are different depending on the input voltage V1, the output current, the output-side power consumption, and so on of the DC-DC converter 132, thereby efficiently converting the input voltage V1 (input power).

6. Modification

While the disclosure has been described in detail with reference to the above aspects thereof, it would be apparent to those skilled in the art that various changes and modifications may be made therein without departing from the scope of the claims.

For example, the power supply unit 27 may include two convert devices or four or more convert devices.

The CPU 12 may perform only one of processing in S17 which changes the convert device without changing the input voltage V1 and processing in S19 and S25 which changes the input voltage V1 and changes the convert device.

In the first embodiment described above, the convert device selection control shown in FIG. 5 is performed by the CPU 12. Alternatively, another device may perform the control. For example, the power controller 25 may perform the convert device selection control shown in FIG. 5. In this case, the power controller 25 is an example of a controller.

A device which stores the switch table 43 does not necessarily need to be a storage device within the printer 1. For example, the CPU 12 may store the switch table 43 in the external apparatus such as a server.

The communication standard of the interface in this disclosure is not limited to the USB PD standard, and may be another communication standard by which power delivery can be performed.

The criteria for determining the standby state, the high load operation state, and the low load operation state discussed in the embodiment described above and the details of the states are just an example. For example, the high load operation state may be a state where the platen roller 48 is rotated at high speed as compared with the low load operation state to perform the printing at high speed.

In the embodiment described above, the convert devices convert the input voltage V1 to the output voltage V2. Alternatively, the convert devices may convert the input voltage V1 to the output voltage V3 (higher than V2). In other words, the printer 1 may supply power converted to the output voltage V3 by each of the convert devices to the thermal head 47 and the motor that drives the platen roller 48.

In the embodiment described above, the printer 1 includes, as the convert device for converting power supplied through the USB interface 19, only the convert device that converts the input voltage V1 to the output voltage V2. Alternatively, the printer 1 may further include a convert device that converts the input voltage V1 to the output voltage V3.

At least part of the power controller 25 may be a controller having the function of controlling power delivery in accordance with the USB PD standard, that is, a so-called PD controller.

In the above-described embodiment, the CPU 12 is adopted as the controller of this disclosure. However, the controller of this disclosure is not limited to this. For example, at least part of the controller may be formed by a dedicated hardware such as an ASIC (Application Specific Integrated Circuit). The controller may be configured to operate by combination of processing by software and processing by hardware, for example.

In the above-described embodiment, the portable printer 1 is adopted as the information processing apparatus of this disclosure. However, the information processing apparatus of this disclosure is not limited to this. The information processing apparatus of this disclosure may be a stationary printer, instead of a portable printer. Further, the information processing apparatus of this disclosure may be a copier, a facsimile apparatus, a scanner apparatus, or a camera, instead of a printer. Further, the information processing apparatus of this disclosure may be a multifunction peripheral (MFP) having a plurality of functions.

What is claimed is:
1. An information processing apparatus comprising:
an interface configured to perform power delivery and communication with an external apparatus;
a convert device configured to convert a voltage of input power that is supplied from the external apparatus through the interface, the convert device including:

a first convert device having first conversion efficiency; and a second convert device having second conversion efficiency different from the first conversion efficiency;

a processing device configured to operate by using power converted by the convert device; and a controller configured to switch a conversion state between:

a first conversion state of converting, by the first convert device, the input power supplied from the external apparatus through the interface and supplying the converted input power to the processing device; and a second conversion state of converting, by the second convert device, the input power supplied from the external apparatus through the interface and supplying the converted input power to the processing device, wherein the processing device is configured to operate in a first state and a second state, an amount of power consumption in the second state being larger than an amount of power consumption in the first state;

wherein the second conversion efficiency is higher than the first conversion efficiency in a state where the processing device is in the second state; and wherein the controller is configured to, in response to a change of a state of the processing device from the first state to the second state, switch the conversion state from the first conversion state to the second conversion state.

2. The information processing apparatus according to claim 1, wherein the first conversion efficiency is higher than the second conversion efficiency in a state where the processing device is in the first state; and wherein the controller is configured to, in response to a change of a state of the processing device from the second state to the first state, switch the conversion state from the second conversion state to the first conversion state.

3. The information processing apparatus according to claim 1, wherein the controller is configured to:

in response to determining that conversion efficiency by the convert device improves by switching the conversion state between the first conversion state and the second conversion state without changing an amount of power of the input power supplied from the external apparatus, switch the conversion state between the first conversion state and the second conversion state.

4. The information processing apparatus according to claim 1, wherein the interface is configured to perform power delivery and communication by connection compatible with a USB (Universal Serial Bus) standard.

5. The information processing apparatus according to claim 1, wherein the first convert device includes at least a linear regulator or a DC-DC converter.

6. The information processing apparatus according to claim 1, wherein the second convert device is a DC-DC converter.

7. The information processing apparatus according to claim 1, wherein the processing device includes at least a CPU or a sensor.

8. The information processing apparatus according to claim 1, wherein the processing device is configured to form an image; and wherein the second state is a state in which the processing device forms an image at a higher print speed than a print speed in the first state.

9. The information processing apparatus according to claim 1, wherein the processing device is configured to form an image; and wherein the second state is a state in which the processing device forms an image of a higher image quality than an image quality in the first state.

10. An information processing apparatus comprising:

an interface configured to perform power delivery and communication with an external apparatus;

a convert device configured to convert a voltage of input power that is supplied from the external apparatus through the interface, the convert device including:

a first convert device having first conversion efficiency; and a second convert device having second conversion efficiency different from the first conversion efficiency;

a processing device configured to operate by using power converted by the convert device; and a controller configured to switch a conversion state between:

a first conversion state of converting, by the first convert device, the input power supplied from the external apparatus through the interface and supplying the converted input power to the processing device; and a second conversion state of converting, by the second convert device, the input power supplied from the external apparatus through the interface and supplying the converted input power to the processing device, wherein the controller is configured to:

determine whether conversion efficiency by the convert device improves by changing an amount of power of the input power supplied from the external apparatus from a first amount of power to a second amount of power, the second amount of power being different from the first amount of power; and in response to determining that the conversion efficiency improves by changing the amount of power of the input power supplied from the external apparatus, request the external apparatus to supply the second amount of power through the interface.

11. The information processing apparatus according to claim 10, wherein the controller is configured to:

in response to determining that the input power of the second amount of power is not received from the external apparatus after requesting the external apparatus to supply the second amount of power, select a state of higher conversion efficiency from among the first conversion state and the second conversion state.

12. An information processing apparatus comprising:

an interface configured to perform power delivery and communication with an external apparatus;

a convert device configured to convert a voltage of input power that is supplied from the external apparatus through the interface;

a processing device configured to operate by using power converted by the convert device; and a controller configured to output a control signal to the convert device, the convert device having:
- a first conversion state of converting the input power with first conversion efficiency and supplying the converted input power to the processing device; and
- a second conversion state of converting the input power with second conversion efficiency different from the first conversion efficiency and supplying the converted input power to the processing device, the controller being configured to switch a conversion state of the convert device between the first conversion state and the second conversion state based on the control signal, wherein the processing device is configured to operate in a first state and a second state, an amount of power consumption in the second state being larger than an amount of power consumption in the first state;

wherein the second conversion efficiency is higher than the first conversion efficiency in a state where the processing device is in the second state; and wherein the controller is configured to, in response to a change of a state of the processing device from the first state to the second state, switch the conversion state from the first conversion state to the second conversion state.

13. The information processing apparatus according to claim 12, wherein the first conversion efficiency is higher than the second conversion efficiency in a state where the processing device is in the first state; and
wherein the controller is configured to, in response to a change of a state of the processing device from the second state to the first state, switch the conversion state from the second conversion state to the first conversion state.

14. The information processing apparatus according to claim 12, wherein the controller is configured to:
in response to determining that conversion efficiency by the convert device improves by switching the conversion state between the first conversion state and the second conversion state without changing an amount of power of the input power supplied from the external apparatus, switch the conversion state between the first conversion state and the second conversion state.

15. The information processing apparatus according to claim 12, wherein the interface is configured to perform power delivery and communication by connection compatible with a USB (Universal Serial Bus) standard.

16. The information processing apparatus according to claim 12, wherein the convert device includes at least a linear regulator or a DC-DC converter.

17. The information processing apparatus according to claim 12, wherein the processing device includes at least a CPU or a sensor.

18. A non-transitory computer-readable storage medium storing a set of program instructions for controlling an information processing apparatus including a controller, an interface configured to perform power delivery and communication with an external apparatus, a convert device configured to convert a voltage of input power that is supplied from the external apparatus through the interface, the convert device including a first convert device having first conversion efficiency and a second convert device having second conversion efficiency different from the first conversion efficiency, and a processing device configured to operate by using power converted by the convert device, the set of program instructions, when executed by the controller, causing the information processing apparatus to perform:

switching a conversion state between:
- a first conversion state of converting, by the first convert device, the input power supplied from the external apparatus through the interface and supplying the converted input power to the processing device; and
- a second conversion state of converting, by the second convert device, the input power supplied from the external apparatus through the interface and supplying the converted input power to the processing device, wherein the processing device is configured to operate in a first state and a second state, an amount of power consumption in the second state being larger than an amount of power consumption in the first state;

wherein the second conversion efficiency is higher than the first conversion efficiency in a state where the processing device is in the second state; and wherein the set of program instructions, when executed by the controller, causes the information processing apparatus to perform:
in response to a change of a state of the processing device from the first state to the second state, switching the conversion state from the first conversion state to the second conversion state.

19. The non-transitory computer-readable storage medium according to claim 18, wherein the first conversion efficiency is higher than the second conversion efficiency in a state where the processing device is in the first state; and
wherein the set of program instructions, when executed by the controller, causes the information processing apparatus to perform:
in response to a change of a state of the processing device from the second state to the first state, switching the conversion state from the second conversion state to the first conversion state.

20. A non-transitory computer-readable storage medium storing a set of program instructions for controlling an information processing apparatus including a controller, an interface configured to perform power delivery and communication with an external apparatus, a convert device configured to convert a voltage of input power that is supplied from the external apparatus through the interface, and a processing device configured to operate by using power converted by the convert device, the set of program instructions, when executed by the controller, causing the information processing apparatus to perform:

outputting a control signal to the convert device; and
switching a conversion state of the convert device between a first conversion state and a second conversion state based on the control signal, the first conversion state being a state of converting the input power with first conversion efficiency and supplying the converted input power to the processing device, the second conversion state being a state of converting the input power with second conversion efficiency different from the first conversion efficiency and supplying the converted input power to the processing device, wherein the processing device is configured to operate in a first state and a second state, an amount of power consumption in the second state being larger than an amount of power consumption in the first state;

wherein the second conversion efficiency is higher than the first conversion efficiency in a state where the processing device is in the second state; and wherein the set of program instructions, when executed by the controller, causes the information processing apparatus to perform:
in response to a change of a state of the processing device from the first state to the second state, switching the conversion state from the first conversion state to the second conversion state.

\* \* \* \* \*